US011038938B2

(12) United States Patent
Chen et al.

(10) Patent No.: US 11,038,938 B2
(45) Date of Patent: Jun. 15, 2021

(54) METHODS AND APPARATUS FOR PROVIDING ALTERNATIVE CONTENT

(71) Applicant: Time Warner Cable Enterprises LLC, New York, NY (US)

(72) Inventors: David Chen, Ashburn, VA (US); Vipul Patel, Great Falls, VA (US); Kyle D Carnes, Arvada, CO (US); Sachin Reddy Kota, Herndon, VA (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 297 days.

(21) Appl. No.: 15/138,031

(22) Filed: Apr. 25, 2016

(65) Prior Publication Data
US 2017/0310722 A1    Oct. 26, 2017

(51) Int. Cl.
*H04L 29/06*    (2006.01)

(52) U.S. Cl.
CPC ...... *H04L 65/4084* (2013.01); *H04L 65/4076* (2013.01); *H04L 65/605* (2013.01)

(58) Field of Classification Search
CPC ................. H04L 65/4084; H04L 65/4076; H04L 65/605
See application file for complete search history.

(56) References Cited

U.S. PATENT DOCUMENTS

| 2003/0061333 | A1* | 3/2003 | Dean | H04L 41/0253 |
| | | | | 709/223 |
| 2011/0096828 | A1* | 4/2011 | Chen | H04N 21/23106 |
| | | | | 375/240.02 |
| 2011/0145430 | A1* | 6/2011 | Ha | H04N 21/23439 |
| | | | | 709/231 |
| 2011/0231519 | A1* | 9/2011 | Luby | H04N 21/23106 |
| | | | | 709/219 |

(Continued)

OTHER PUBLICATIONS

Guidelines for Implementation: DASH-IF Interoperability Points DASH Industry Forum, Version 3.2 Section 4.3.2.2.3 and 4.4 (Year: 2015).*

(Continued)

*Primary Examiner* — Javier O Guzman
(74) *Attorney, Agent, or Firm* — Straub & Straub; Michael P. Straub; Stephen T. Straub

(57) ABSTRACT

Methods and apparatus that facilitate providing alternative content to customer devices in systems supporting DASH streaming are described. Various features relate to dynamically modifying and providing media presentation description (MPD) information to customer devices. MPD information is used by customer devices to obtain media content, e.g., program content and/or alternative content. The client device, e.g., a IP content playback device, switches between a mode used during playing of program segments in which an in-band EMSG is used to trigger a request for an MPD update and a mode of operation used during the playing of additional or alternative content segments during which the (Continued)

client device will periodically request MPD information. By limiting requests for MPD information during normal program segments to requests triggered by an EMSG the number of update requests can be minimized or reduced as compared to other approaches where requests for updated MPD information are made periodically.

18 Claims, 5 Drawing Sheets

(56) References Cited

U.S. PATENT DOCUMENTS

| | | | | |
|---|---|---|---|---|
| 2011/0307545 | A1* | 12/2011 | Bouazizi | H04N 21/234345 709/203 |
| 2012/0042090 | A1* | 2/2012 | Chen | H04L 65/604 709/231 |
| 2012/0198031 | A1* | 8/2012 | Bouazizi | H04L 65/4084 709/219 |
| 2013/0144714 | A1* | 6/2013 | Yuan | H04L 65/4069 705/14.47 |
| 2013/0166771 | A1* | 6/2013 | Thang | H04N 21/6125 709/231 |
| 2014/0059180 | A1* | 2/2014 | Giladi | H04N 21/8456 709/219 |
| 2014/0150044 | A1* | 5/2014 | Takahashi | H04N 21/2225 725/116 |
| 2015/0269629 | A1* | 9/2015 | Lo | H04N 21/85406 705/14.66 |
| 2016/0182973 | A1* | 6/2016 | Winograd | H04N 21/23892 725/25 |
| 2016/0219094 | A1* | 7/2016 | Ye | H04L 65/608 |
| 2017/0111463 | A1* | 4/2017 | Maze | H04L 67/26 |
| 2019/0069028 | A1* | 2/2019 | Deshpande | H04N 21/235 |

OTHER PUBLICATIONS

DASH Industry Forum, Guidelines for Implementation: DASH-IF Interoperability Points, Version 4.3 (Year: 2018).*

* cited by examiner

METHODS AND APPARATUS FOR PROVIDING ALTERNATIVE CONTENT

FIELD OF THE INVENTION

The present invention relates to methods and apparatus relating to content delivery and/or content playback and, more particularly, to methods and apparatus that facilitate providing alternative content in systems supporting content streaming, e.g., using MPEG DASH.

BACKGROUND

Consumer digital video and/or other types of media can be stored and delivered in many forms and via many services and/or delivery techniques. In the context of broadcast systems and/or other devices a program is often divided into segments for transmission. Additional segments providing news alerts or other information not directly part of a program and/or other content such as advertisements maybe incorporated into media including program segments and the additional information segments to be broadcast or streamed.

While the program segments will normally remain unchanged, it is often desirable to replace the additional segments at or near the time the content in the program and/or additional segments is played.

In the case of broadcast programs indicators of upcoming additional segments such as information segments or advertising segments are often signaled using SCTE 35 cues sent with the broadcast content. In addition to broadcast content, content is now often delivered in a digital format.

In the last few years media content delivered over the Internet, e.g., via IP (Internet Protocol) has gained tremendous popularity, in part because of an increasing number of users demanding content delivery to advanced devices capable of playing back content delivered over IP such as new Smartphones, palm tops and/or tablet devices.

One mechanism for use in content delivery over IP that has gained popularity is DASH (Dynamic adaptive streaming over HTTP (Hypertext Transfer Protocol). MPEG DASH is an MPEG based version of DASH. DASH is an adaptive bitrate streaming technology where a multimedia file is partitioned into one or more segments, with each segment containing a short interval of playback time of content that is may be hours in duration, such as a movie or live broadcast of an event. A discussion of DASH can be found in International Standard ISO/IEC 23009-1, Second Edition, 2014 May 15 titled: Information Technology— Dynamic adaptive streaming over HTTP (DASH) Part 1 Media presentation description and segment formats.

The content segments are delivered to a DASH client using HTTP. A media presentation description (MPD) that describes segment information, e.g., timing, URL, media characteristics like video resolution, bit rates etc., is provided to client devices to allow them to obtain content segments. The MPD may include information for a program stream including the segments of a program as well as the additional segments incorporated with the program segment and intended to be presented during program playback. As discussed above additional segments maybe ones which it would be desirable to replace with segments with more current or more relevant information than additional segments originally incorporated with the program segments. For example it may be desirable to replace some additional segments with locally relevant information which is not to be supplied to all regions and/or consumers.

Thus it should be appreciated that it is desirable to be able to replace some media segments described in an MPD with updated media segments at or shortly before presentation, e.g., in a dynamic manner.

Frequently polling a source of MPD information, e.g., every few seconds, for an update which might include information identifying an alternative segment to one identified in an earlier MPD file corresponding to the same program is one way of supporting the provision of alternative content, such an approach can result in excessive loading.

Accordingly, there is a need for a method which allows for updating of MPD information without continuously polling during the duration of a program for MPD updates.

It would be desirable if methods and/or apparatus could be developed which allowed for the use of the DASH standard and the supplying of updated MPDs with information corresponding to alternative content without the need for polling for MPD updates throughout the duration of a program or set of segments corresponding to a program.

SUMMARY

Methods and apparatus that facilitate inserting and providing alternative content, e.g., targeted and/or relevant content, to customer devices in systems supporting DASH streaming are described. The alternative content may include targeted locally relevant content, e.g., weather update segment of news, traffic update segment, a local office election result update etc. that relates to a consumer, group of consumers, region, time, etc. and/or replacement ad content Various described features relate to dynamically modifying and providing media presentation description (MPD) information to customer devices, also referred to as DASH clients, e.g., based on customer geographic location, or customer demographic. The modified and/or updated MPD information is provided to customer devices for use in obtaining media content, e.g., program content and/or alternative content in a signaling efficient manner, e.g., without the need for the client device to request MPD updates throughout the duration of a program.

In various embodiments, when a client is provided with an initial MPD corresponding to a set of program segments and additional content segments to be played, e.g., in response to a request for an MPD corresponding to a program, the client device is signaled not to periodically request MPD updates. Thus initially the client device will operate in a static mode and not periodically request MPD updates. An in-band message, e.g., an In-band Emessage (Emsg), is used to trigger the client device to request an updated MPD prior to a segment corresponding to alternative content. In response to such an in band trigger message, the client device will request an MPD. Thus, while a client device is receiving content corresponding to the main program in-band messages will be used to trigger MPD requests before additional content is played.

In response, to the request for an MPD the device responsible for responding the will respond with an MPD that will trigger a content resolution request prior to the time the upcoming additional content segment is played. As part of the response to the MPD request the device will also include a non-zero value of T in the communicated MPD information which will cause the client device to switch from the mode in which it does not request updated MPD information to a mode in which it will request an updated MPD at the time period T. Thus during an additional content period the client device will regularly request updated MPD information providing the MPD system responsible for responding to such requests and opportunity to provide new MPD information which will result in alternative, e.g., locally relevant, more recent, and/or targeted alternative content, being retrieved by the client device rather than the original additional content that was identified in the initial MPD file.

By providing an MPD response for the additional content period which causes the client device to initiate a content resolution request just before the additional content period begins, the MPD system is provided with sufficient time between the initial MPD request, and the triggered subsequent content resolution request, to access an alternative content server. By accessing the alternative content server the MPD system is able to check what, if any, alternative content should be identified to the client device in place of the original alternative content listed in the initial MPD file corresponding to the program being viewed.

If alternative content is available and is to be provided as an alternative to the original additional content to be played with the program segments, the MPD system responds to the content resolution request with information identifying the alternative content to be retrieved by the client device. If no alternative content is available, the MPD system responds to content resolution request with information identifying the original additional content that was to be displayed at the time period to which the content resolution request corresponds.

The MPD system is aware of the duration of non-program periods within an MPD corresponding to the program. In response to a request for an MPD which will begin with content corresponding to a program period following an additional content, e.g., non-program content period, the MPD system responds with an MPD with MUP=0 which will cause the client device, e.g., content playback device, to switch back to a mode of operation in which MPD requests will not be made unless triggered by an in-band EMSG, e.g., a message included with program content sent to the client device.

Since program content periods will normally occupy the majority of time periods associated with a program and the additional content periods will occupy a relatively small portion of time, e.g., time periods used for additional local information or ad periods, during the majority of the time a program is being supplied, the client device will operate in a mode where MPD requests are not made periodically but rather only sent in response to in band EMSGs. The EMSGs in one such embodiment are used to trigger MPD requests.

During additional content periods, the MPD system through the setting of a non-zero MUP value will cause the client device to poll at predictable intervals for an updated MPD. At the end of the additional content period the MPD system will cause the client device to switch back to the static MPD update mode, e.g., by sending in MUP=0 to the client device. In the static MPD update mode the client device does not seek updated MPDs unless an MPD request is triggered by an in-band EMSG sent with program content.

While the client device can easily receive in-band Emessages corresponding to a program, the same alternative content maybe supplied to multiple different client devices. The client devices to which the alternative content is supplied may have been viewing different programs. Since the location of additional content segments may vary from one program to another, it is preferable in at least some embodiments to avoid the use of in-band Emessages in alternative content that may be supplied for use in place of content from multiple different program channels. The methods describe herein allow for Emsg trigger use to be avoided within alternative content during alternate content periods facilitating the use of the same alternative content with multiple different programs.

The ability to dynamically modify and provide such updated MPD information to customer devices allows service providers to seamlessly switch default content with alternative content, e.g., targeted advertisements and/or other alternative content, and inform the customers to obtain the alternative content using the provided updated MPD information. Dynamic modifying and/or updating the MPD information in some embodiments is performed, e.g., at or after the time of request for the MPD information from a DASH client. Various features allow providing MPD information updates to DASH client devices in an efficient manner without increasing network traffic and congestion and without increasing overloading of an MPD system providing MPD information which otherwise hinders performance and efficiency of the MPD system.

In various embodiments the MPD system provides MPD information to DASH client devices for use in obtaining actual multimedia content to be played. The multimedia content typically includes both entertainment program as well as advertisements. In various embodiments a DASH client, e.g., a customer playback device, is provided MPD information for use in obtaining content segments corresponding to a user selected entertainment program, e.g., a first program. The MPD information includes information describing media segments and information to locate first program content segments that allows the customer device to download content segments, e.g., on play time, and play the media content segments in sequence.

While various embodiments have been discussed in the summary above, it should be appreciated that not necessarily all embodiments include the same features and some of the features described above are not necessary but can be desirable in some embodiments. Numerous additional variations and embodiments are possible and remain within the scope of the invention. Numerous additional features, embodiments and advantages of various embodiments of the present invention are discussed in the detailed description which follows.

DETAILED DESCRIPTION

Figure 1:
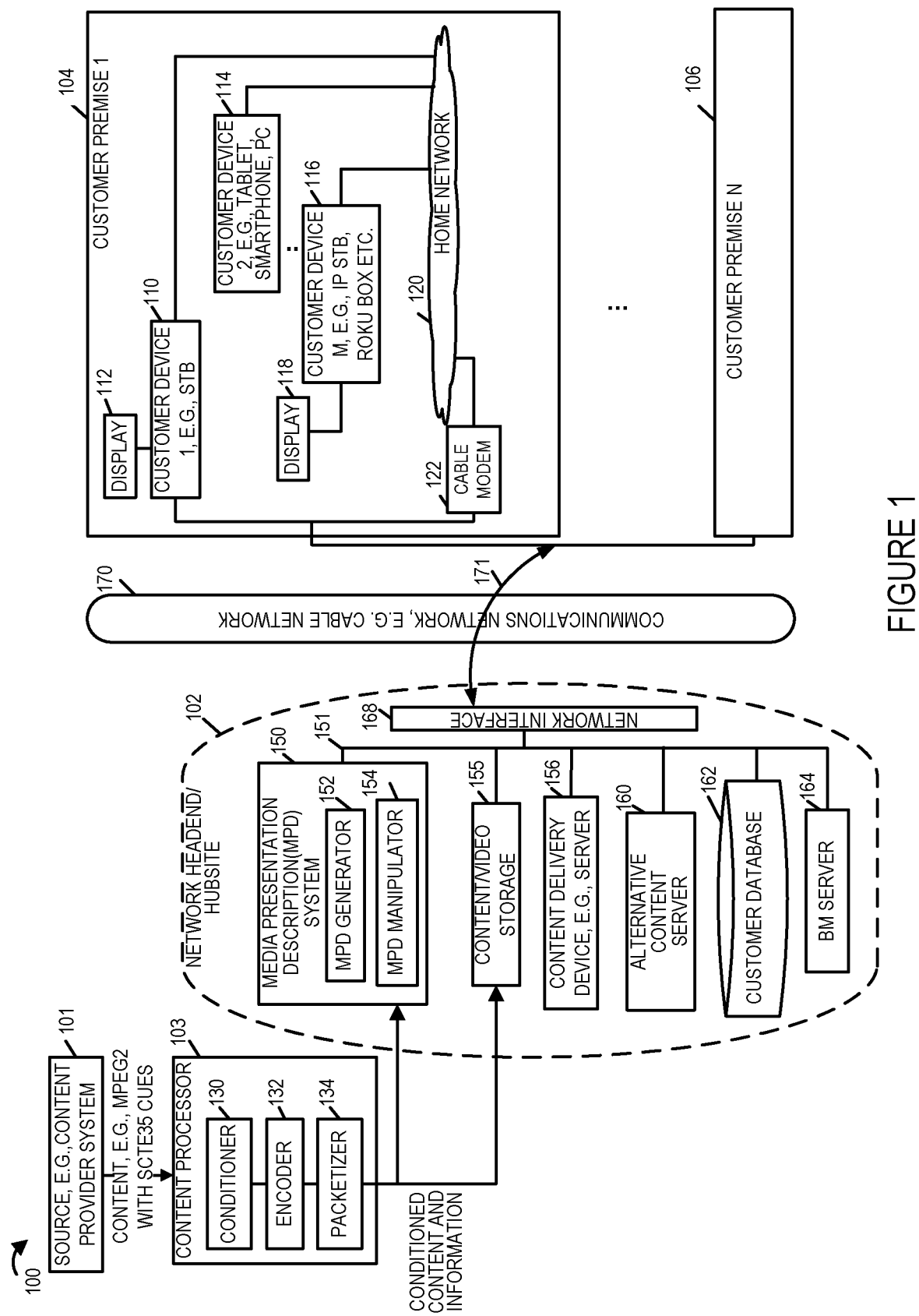
FIG. 1 illustrates an exemplary system implemented in accordance with the some embodiments of the present invention.

FIG. 1 illustrates an exemplary system 100 implemented in accordance with one exemplary embodiment of the present invention. The system 100 supports delivery of content to customer premise equipments (CPEs) including content playback devices in accordance with various embodiments of the invention. The system 100 includes a content provider system 101, network headend 102, a transcoder 103, a communications network 170, e.g., a hybrid fiber-coaxial (HFC) network, satellite network, and/or internet, a plurality of customer premises 104, 106. In cable network embodiments the network headend is a data center or other service center to which multiple households are normally coupled and where one or more servers are located. In other types of networks the network headend 102 may, and sometimes is, implemented as a distribution center with one or more servers and/or other equipment used to provide video and/or other services. In various embodiments the content, e.g., multimedia content, is delivered from the headend 102 over the communications network 170 to one or more devices at the customer premises 104, 106 using a streaming technique depending on the customer device capability and/or user preference. System 100 supports MPEG DASH content streaming. In some embodiments the customer premises 104, 106 include a variety of devices including, e.g., legacy set top box (STB) devices, IP capable devices such as laptops, IP STB devices, iPADs, Android tablets, smart TVs, smart phones and/or other streaming devices such as ROKU® box etc.

The content source 101, e.g., content provider system, is illustrated as a single system but may include a plurality of servers corresponding to various content providers including providers of on-demand and/or live content. The content provider system 101 provides content to the headend 102 for delivery to customer devices. Typically the content is provided in standard media coding formats such as MPEG2, MPEG4. In various embodiments slots are pre allocated for advertisements (ads) by the content provider system 101 in which advertisements can be placed. The ad break/slot is indicated in the original transport stream via SCTE-35 cues. If advertisement data is already included in the corresponding advertisement slots the headend 102 may choose to replace original advertisement content with replacement, e.g., targeted advertisement, content and/or alternative program content. The content provider system 101 also provides advertisement metadata (as indicated by arrows 174, 176) including advertisement slot location and length/duration in terms of time, to various servers of system 100. This information is used by various devices such as the alternative content server 160 and/or the content servers 156 to manage insertion of alternative content, e.g., targeted advertisements (ads) or other relevant content, in the content stream and/or for play out of ads during the advertisement slot durations.

The content provider system 101 provides the content stream to the content processor 103. The content processor system 103 is configured to process the received content stream and supply it to the headend 102 for distribution and delivery. The processing includes conditioning, encoding and packetization which is performed respectively by the conditioner 130, encoder 132 and packetizer 134. The conditioner 130 processes the received content stream to analyze the included SCTE-35 cues and generates conditioned ad metadata indicating advertisement slot location, ad start and end timing, duration and/or such information that can be used by one or more elements of headed 102 to generate media description information and insert and/or replace ads when desired. The conditioner 130 in some embodiments provides instructions to the packetizer 134 to insert data to content segments that indicates an event, e.g., change in media presentation description information. In order to deliver content over IP, e.g., using MPEG DASH, the received content transport stream which is in, e.g., MPEG2, MPEG4 or other format, is encoded by the encoder 132 in a format that allows the content to be delivered over HTTP and thus allowing reaching customers beyond those tuned via traditional STBs. The encoder 132 may perform transcoding to change the format. The encoded, e.g., transcoded, content is then packetized by the packetizer 134 to generate packetized transcoded content, e.g., content segments that can be delivered via HTTP, e.g., over IP. The conditioned content and advertisement metadata is provided from the content processor to the MPD system 150 and content storage 155 in the headend 102.

The network headend 102 may be implemented at a cable network office or hubsite serving a plurality of customer premises and includes multiple servers and databases which are coupled together by a local network 151. In some embodiments the network headend 102 is a part of a service provider's Content Distribution Network (CDN). In the FIG. 1 example, the headend 102 includes a Media Presentation Description (MPD) system 150, a content delivery device, e.g., server 156, which may include one or a plurality of streaming servers for delivering content, content storage 155, an alternative content server 160, a customer database 162 and a business management server 164. It should be appreciated that some of the servers and/or elements shown to be included in the headend 102 may reside outside the headend 102 in some embodiments and may be located anywhere in the system 100, e.g., in a distributed manner. The local network 151 is coupled via one or more network interfaces 168 to other networks and/or devices. For example, the headend 102 is coupled via network interface 168 to communications network 170 and may also be coupled to one or more other external networks. Via the network 170, the elements shown in the network headend 102 can send and/or exchange various information with the devices located at the customer premises 104, 106. As shown the communications link 171 traversing the communications network 170 couples the CPEs at the customer premises 104, 106 to the various elements/servers shown in the network headend 102.

The Media Presentation Description (MPD) system 150 receives conditioned content and information from the content processor 103. The MPD generator is configured to generate DASH Media Presentation Description files which are provided to customer devices requesting content. The DASH MPD file includes MPD information about media content segments, their relationships and information for use in choosing between them, and other metadata that may be used by customer devices. The MPD information includes information regarding actual program content segments as well as advertisement segments/alternative content segments, their durations, start/end times, URL to obtain each these segments. Thus MPD information provides segment information, e.g., timing, URL, media characteristics such as available resolutions and bit rates. Using the MPD information the customer devices can obtain content, e.g., content segments corresponding to entertainment program and/or non program (e.g., advertisement) content segments. The MPD manipulator 154 is configured to parse the information included in the MPD file and when desired manipulate/ modify information in the MPD file, e.g., change one or more described parameters and/or replace URLs of one set of content segments with URLs of another set of segments. The media content is passed on to the content storage 155 from where it can be accessed by one or more devices in headend 102 for streaming to customer devices. In some embodiments the MPD files are also stored on the content storage 155. The content storage 155 stores content, e.g., audio, video and/or other multimedia content. Thus the MPD information in some embodiments provides a list of the available media segment URLs. Customer devices can then sequentially request the media segments as required to provide uninterrupted playback of the media presentation.

The content delivery device 156 may include one or a plurality of streaming servers for delivering content, e.g., a broadcast file server (BFS), a switched digital video (SDV) content server, a video on-demand (VOD) server and/or an IP server capable of delivery content over IP (Internet Protocol). The content delivery device 156 delivers content including program content and advertising content and/or other information to one or more customer devices, e.g., set-top boxes and/or other playback devices, using a delivery mechanism based on receiving customer device's capability. For example the content may be delivered via a QAM broadcast stream to devices that receive broadcast content, and/or via SDV to customer devices which support receiving SDV content and/or over IP via an IP channel and/or a VOD channel to devices capable over receiving content over IP. The term VOD server is intended to cover a wide range of different types of VOD servers and is not limited to a particular analog or IP (Internet Protocol) based embodiment or an embodiment which is limited to delivery via a particular type of network. In various embodiments the content server 156 can access the programming content from the content storage 155 and deliver to various customer devices via the communications network 170.

The alternative content server 160 includes a cache of alternative content including advertisements that can be served to customer devices. In various embodiments the alternative content server 160 is configured to make decision whether or not to server alternative content during an alternative content presentation window and what alternative content is to be served to a given customer device at a given presentation opportunity, e.g., based on content being served/viewed, customer's profile, time of presentation, service provider's instructions and/or other business rules. In some embodiments the alternative content server 160 provides targeted replacement advertisements and/or locally relevant content to customer devices when a decision to provide alternative content in place of default content is made.

The customer database 162 includes, for a plurality of customers, customer information, e.g., customer profile, customer account information and information regarding the devices installed at customer premises. In some embodiments customer account information includes, e.g., account number, subscription/service information, customer device capability and other billing related information. Customer database 162 also includes customer device information, e.g., identification and/or other information regarding customer devices such as STBs, streaming devices, gateways, modems etc., installed at various customer premises served by the headend 102. BM (Business management) server 164 processes billing information corresponding to customers serviced by the headend 102.

Referring now to the customer premises shown in system 100. Each customer premise 104, 106 may include a plurality of CPEs including playback devices. In various embodiments the CPEs located at the customer premises include, e.g., modems, gateway devices, routers, and playback devices including, e.g., set top box, internet capable TVs, personal computers, laptops, tablet devices, smart phones etc. In various embodiments a content playback device presents the program content to a viewer, e.g., customer/subscriber. FIG. 1 shows some details of customer premise 1 104. The customer premise 104 includes a modem 122 and various devices including a customer device 1 110, customer device 2 114, . . . , and customer device M 116. Thus it should be appreciated that a variety of devices may exist at a single customer premise where the devices may be coupled together by a home network 120. Customer premise N 106 may be similar to the customer premise 104 and may include same or similar CPEs.

As shown, the customer device 110, e.g., a STB, is coupled to display device 112, customer device 2 114 is e.g., an IP capable device such a tablet device, Smartphone, PC etc., and the customer device M is, e.g., a steaming device such as an IP STB, ROKU box or IP streaming device, is coupled to display device 118. It should be appreciated that in some embodiments customer devices can be integrated in a device which also includes a display. The display devices could be, e.g., standard televisions. In some embodiments the STB 110 may be e.g., a legacy QPSK STB, a DOCSIS (Data Over Cable Service Interface Specification) set top box, an SDV capable set top box, an IP-STB, and/or a hybrid set top box. The customer devices 114 and 116 are capable of receiving MPEG DASH content segments, e.g., using MPD information to obtain content segments, and performing playback.

Figure 2:
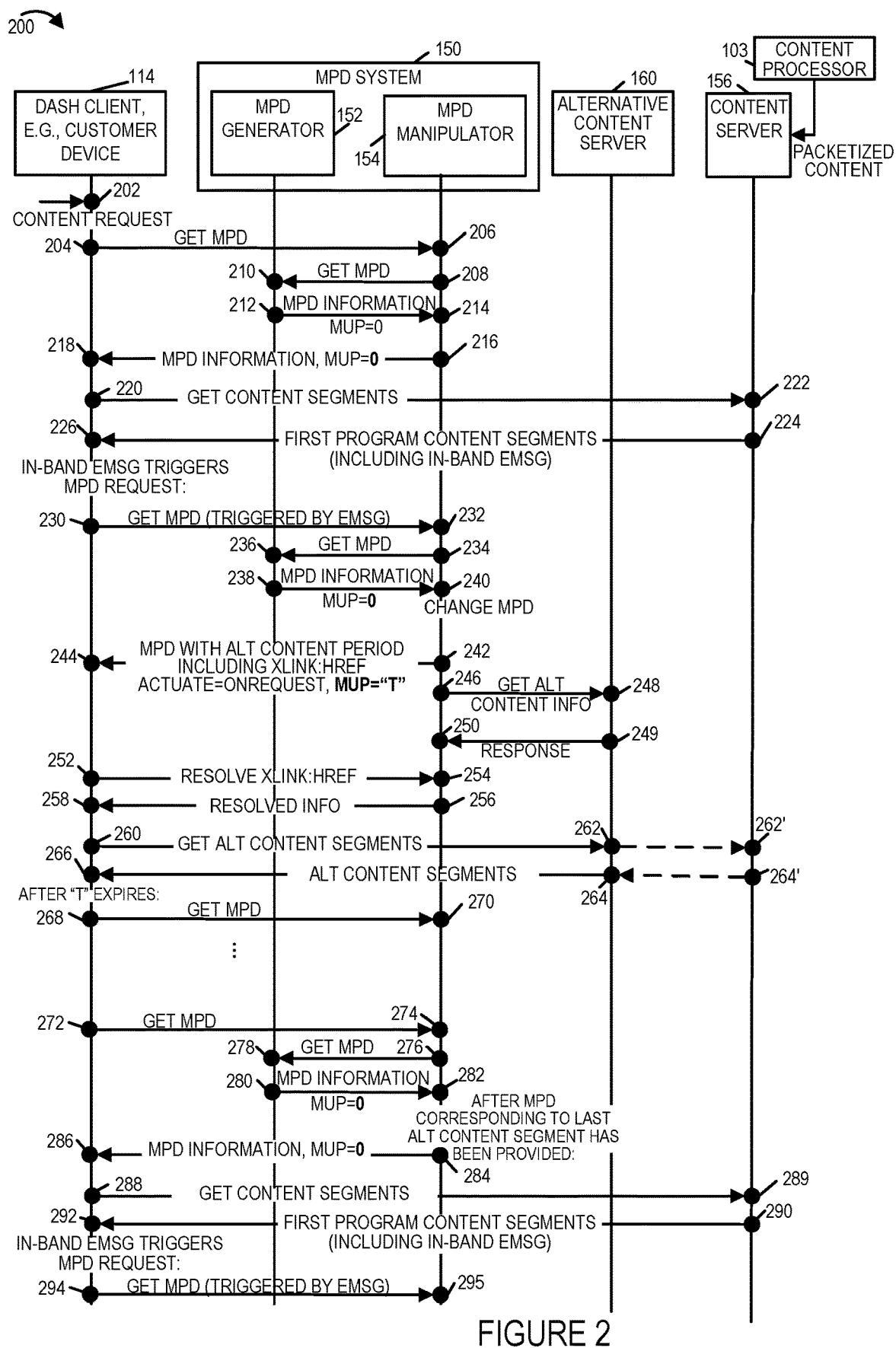
FIG. 2 illustrates the signaling and processing steps associated with an exemplary method of dynamically updating and providing media presentation description information using the system of FIG. 1.

An exemplary process 200 will now be discussed in detail with regard to the example shown in FIG. 2. Elements of the system 100 shown in FIG. 1 which participate in the method being described in the FIG. 2 example are shown at the top of FIG. 2 and bear the same reference numbers as used in FIG. 1. Messages, information, content and/or signals communicated between devices are represented in FIG. 2 using arrows. In some embodiments the signals communicate requests and responses to such requests. In some embodiments requests may be e.g., requests for MPD information, content and/or additional information while a response signal includes information and/or content provided in response to such requests.

At the top of FIG. 2, various elements of the system 100 which may participate in the exemplary method in accordance with one embodiment of the invention, are shown. The illustrated elements include customer device 114, the MPD system 150 including the MPD generator 152 and MPD manipulator 154, alternative content server 160, and the control server 156. The content processor providing conditioned packetized content to the content server 156 is also shown. For the purposes of discussion consider that the customer device 114 is a DASH client, e.g., an IP (Internet Protocol) capable device capable of receiving MPEG DASH content stream.

In the illustrated example, the process starts with the customer device 114 receiving a user input signal in step 202, e.g., input indicating selection of program content. Next in step 204 the customer device 114 sends a GET MPD signal communicating a request for MPD information, e.g., corresponding to user selected content. As discussed earlier, MPD file provides information regarding content segments of the content including information to access/obtain the content segments of the media, e.g., program being sought by the user. The MPD manipulator 154 receives and processes the GET MPD signal in step 206. In some embodiments the MPD request includes information indicating the segment or segments of the program to which the MPD request corresponds. For example if the user device is at the beginning of the program, the initial MPD request would be for information relating to at least the first segment of the program. If the user was 90 seconds into the program and an MPD request was sent, the MPD request would normally be for information relating at least to the next media segment of the program following the segment at which the user was currently located.

From the information about the time period for which MPD information is requested, the manipulator can determine, e.g., using information about the location of alternative content periods within the program to which the request relates, if the received MPD request is for a time period which begins with a media segment inside an alternative content insertion window or outside an alternative content insertion window. Thus from information included in the MPD request and/or other information about a user's current location in a program, the MPD manipulator 154 is able to determine the period of time for which MPD information is to be provided.

In step 208 the MPD manipulator 154 requests the MPD file for the requested content from the MPD generator 152. The MPD generator 152 receives GET MPD from the manipulator 154 in step 210 and in step 212 responds with MPD information including a period (or periods) of describing content, and with the minimum update period (MUP) parameter value set to "0". Period is an MPD element that describes a part of the content with a start time and duration. The MUP parameter indicates the smallest period between potential changes/updates to the MPD information. The MUP parameter can be, and in some embodiments is, used to control the frequency at which the DASH client (customer playback device) checks for update, e.g., by requesting updated MPD information. By setting MUP value="0" the customer device is being instructed to not periodically request for MPD update but rather when notified, e.g., by in-band "Emsg" in accordance with the invention. The MPD information received by MPD manipulator 154 in step 214 includes period(s) describing content segments corresponding to the first program. Separate period(s) may be, and in some embodiments are, used to describe advertisement segments. Since the MPD request of step is for media segments outside alternative content insertion window the manipulator 154 in step 216 sends, to the customer device 114, MPD information including a first parameter (MUP) having a first value indicating that said user device is not to periodically request media presentation description information, the media presentation description information including information for use in obtaining content segments corresponding to the first program. Thus in step 216 MPD information including the first program period and MUP value set to "0" is sent to the customer device 114 which receives the MPD information, e.g., using HTTP, in step 218. As discussed in detail further below if the start of the period of time for which information is to be provided falls within an alternate content interval, the MPD manipulator 154 will return MPD information with a first parameter value indicating a time period "t" which is non-zero. If the start of the time period for which MPD information is requested falls in a normal program period, the customer device will be provided with MPD information with the first parameter value set to zero and will thus not request MPD updates until triggered to do so by a in-band message.

In step 220 using information included in the period(s) of the MPD information corresponding to the first program, e.g., URL and/or other information, the customer device 114 requests to obtain content segments of the first program. The URL may reference to an entity in the CDN from where the content segments may be obtained. In FIG. 2 embodiment the content server 156 (which is part of the CDN) receives the request in step 222. In step 224 the content server 156 streams the content segments corresponding to the first entertainment program. In some embodiments at least one segment includes an embedded message including data that triggers an MPD update request from the customer device. In various embodiments the embedded message is a DASH in-band "Emsg". In some embodiments during conditioning of the original MPEG transport stream when SCTE-35 advertisement indicator is detected indicating an upcoming advertisement slot the conditioner 130 instructs the packetizer 103 to include the in-band Emsg in a content segment of the first program that precedes the advertisement. The customer device 114 receives the content segments including the in-band Emsg in step 226. The in-band event message (Emsg), e.g., with value="1" works as a notification to the customer device of potential change in MPD information. Without the in-band Emsg the customer device otherwise will not request for updated MPD since in the initial MPD response (step 216) the MUP was set to "0". This mechanism allows the CDN to dynamically add, replace and/or change content for the upcoming advertisement slot if so desired (e.g., to replace default content with desired alternative content) and apprise the customer device to request new MPD information for obtaining the alternative content segments, e.g., upon play time. Absent the trigger due to the "Emsg" the customer device would not know when to request updated MPD information and get information for use in obtaining/accessing alternative content.

Next in step 230, triggered by the received in-band Emsg, the customer device 114 sends a second request (GET MPD) for MPD information, e.g., updated MPD information, to the MPD system 150. Based on information included in the MPD information request the MPD manipulator 154 determines that the request is for media segments that fall within alternative content insertion window. The MPD manipulator 154 receives the second MPD request (GET MPD) in step 232. In step 234 the MPD manipulator 154 requests MPD file from the MPD generator 152. In step 236 the MPD generator 152 receives GET MPD from the manipulator 154 and in step 238 sends MPD information including period(s), e.g., corresponding to the first program and original ads, and with the minimum update period (MUP) parameter value still set to "0" to the MPD manipulator 154. Upon the receiving the MPD file from the generator 152 in step 240 the MPD manipulator 154 checks if there is a period in the received MPD information file that can be used for alternative content information. Upon determining that there is an ad period in the MPD information in accordance with one aspect of the invention the MPD manipulator 154 decides to manipulate, e.g., change/modify, the MPD information received from the generator 152 which allows the MPD manipulator 154 to have a place holder period for alternative content in the MPD file and have sufficient time to determine if default content in the user selected program to which period(s) in the MPD information corresponds should be replaced. In some embodiments the manipulation includes performing one or more of the following in step 240: adding a xlink:href parameter, adding xlink:actuate parameter to the MPD information and also changes the first parameter (MUP) value from "0" to a new value set to "t". The xlink:href parameter provides a reference to an entity that may include one or more elements of the period described in the MPD file, e.g., such as the URL for the content segments corresponding to the alternative content. The manipulator 154 in step 240 adds the xlink:href referencing itself (the MPD manipulator 154) by providing a HTTP URL corresponding to the manipulator 154 in the xlink:href attribute. Further the manipulator 154 sets the xlink:actuate parameter to be="onRequest" instructing that the customer device should seek resolution of the URL provided by the xlink:href parameter, e.g., in order to obtain the alternative content period elements, e.g., URL for content segments corresponding to the alternative content, on play time. By using the xlink:href parameter to the MPD file being sent to DASH client 114 the MPD manipulator 154 ensures there is a placeholder period for alternative content in the MPD file while it gets alternative content information from the alternative content server 160 regarding alternative content to be provided, e.g., one or more replacements ads or other alternative content. It should be appreciated that otherwise a period for alternative content is not available in the MPD file when the manipulator 154 is still trying to get the alternative content information from the alternative content server 160 thus the manipulator 154 may not add the alternative content period to the MPD file being sent since it does not know what alternative content is to be provided. Unless the manipulator 154 knows whether alternative content is available and what alternative content is to be provided it can not add the actual period for the alternative content in the MPD file. Thus by adding the xlink:href the MPD manipulator 154 buys time to request a decision and/or alternative content information and get a response from the alternative content server 160 regarding alternative content to be provided, e.g., whether the media segments corresponding to default content, e.g., a default ad, in the upcoming slot should be replaced and with what alternative content.

When the customer device 114 is tuned to channels supporting delivery of alternative content the customer device 114 is unable to get in-band "emsg" if a notification were to be sent to the customer device regarding MPD update or change since the customer device 114 at such times is playing different media segments (corresponding to alternative content) than the segments that include in-band emsg. Thus by changing the MUP value to "t", the manipulator 154 forces the customer device 114 to check back for updated MPD after every "t" seconds thereby allowing the MPD system 150 to provide updated MPD information that allows customer device to obtain media content segments that correspond to replaced alternative content if the decision from alternative content server 160 is to provide alternative content.

In step 242 the manipulator 154 sends updated MPD information including the first parameter having a second value (MUP=t) indicating a time period after which new media presentation description information is to be requested by the user device, the updated media presentation information including information for use in obtaining content segments corresponding to additional content, e.g., alternative content. The MPD information also includes the xlink:href parameter and xlink:actuate="onRequest". The customer device receives the updated MPD information in step 244. If however the original portions of default content period are not to be changed or no new periods added, the MUP value is not changed and the MPD manipulator 154 sends MPD information with MUP value=0 to the customer device.

In step 246 the MPD manipulator 154 sends a signal (e.g., an alternative content information request) to the alternative content server 160 to determine if the alternative content period in the MPD is to be replaced for the reasons discussed above. The alternative content server 160 receives and processes the signal in step 248. In some embodiments in step 248 the alternative content server 160 makes a decision whether default content for the upcoming ad slot should be replaced with alternative content, e.g., targeted ad and/or other media content to be played in place of the original default content. In some embodiments the decision is based on a number of factors which influence what kind of alternative content is to be presented to the user of the customer device, e.g., based on user's profile, type of entertainment program being watched, previously watched program, user's response to previously presented alternative content, time of the day/night, service providers agreements with sponsoring partners and other such factors. In step 249 the alternative content server 160 sends a response back to the MPD manipulator 154. In step 250 the MPD manipulator 154 receives the response including requested alternative content information. In some embodiments the response includes instructions on what alternative content is to be provide to the customer device, start time, duration etc., and where such alternative content is located, e.g., indicating entity from where the alternative content can be obtained. In some embodiments entity from where the alternative content can be obtained is the alternative content server 160.

On the customer device side, following receipt of the MPD information the customer device in step 252 sends a request to the manipulator 154 to resolve the xlink:href on playtime. The MPD manipulator 154 in step 254 receives, following sending of the updated MPD information and prior to expiration of the time period (t) indicated by the second value, a request for additional information for use in obtaining the content segments corresponding to the alternative content, i.e., request to resolve the xlink:href. The MPD manipulator 154 determines how the resolution request has to be directed in response. Based on the response received from the alternative content server 160, in step 256 the manipulator 154 sends a response, to the request for additional information, including information indicating a source of said content segments corresponding to the additional content. In some embodiments the information includes URL and/or other information, that can be used to obtain content segments corresponding to the alternative content. In some embodiments the information indicating a source indicates said alternative content server 160 as the source for obtaining the content segments corresponding to the alternative content, e.g., when the alternative content server 160 decides that alternative content is to be provided to the user device in place of default content. The customer device 114 receives the resolution response including the URL and/or other information in step 258.

In step 260 the customer device requests actual media segments corresponding to the alternative content from the alternative content server 160 which receives the request in step 262. In some embodiments where the alternative content is to be obtained from the content server 156 the request is sent to the content server 156 instead of the alternative content server 160 as indicated by the extended arrow leading to step 262'. The content server 156 in step 264' or the alternative content server 156 in step 264 sends the alternative content segments to the customer device 114. The alternative content segments are provided in some embodiments to the customer device 114 over a separate and different channel than a channel over which the content segments of the main entertainment program (first program) are provided. The customer device 114 receives the content segments in step 266 and outputs, e.g., displays on a display device, the received media corresponding to the alternative content to the user. The process continues and additional content segments corresponding to the alternative media content segments are received, processed and output by the customer device 114.

In step 268 upon expiration of time period "t" indicated in the communicated MPD information the customer device 114 sends a GET MPD request to the MPD system 150 where the request is received by manipulator 154 in step 270. In the manner discussed above (e.g., step 242) the manipulator 154 will respond with MPD information. There may be one or more MPD update requests (e.g., GET MPD) during this time. For example for a 1 minute slot where alternative content may be provided, the alternative content may provide two 30 second alternative content segments. The manipulator 154 may select such a value of "t" in the MPD file to make the DASH client device request MPD information for each of the two 30 second alternative content segments.

Step 272 temporally occurs after expiration of time period "t" indicated in a MUP value of the MPD information corresponding to the last alternative content segment, e.g., upon expiration of "t" indicated in the MPD information corresponding to the last content segment of alternative content. Accordingly after expiration of "t" indicated in the MPD information that described information corresponding to the last content segment of alternative content the customer device 114 in step 272 sends a GET MPD request to the MPD system 150 where the request is received by manipulator 154 in step 274. In step 276 the MPD manipulator requests MPD information from the generator 152.

After receiving the request from the manipulator 154 in step 278, the MPD generator 152 in step 280 responds with MPD information including a period (or periods) of the next segment(s) of the first entertainment program, and with the minimum update period (MUP) parameter value set to "0". Since MPD information describing periods of the alternative content has been communicated, the MPD system 150 is aware that requested MPD information is for the next media segments outside the alternative content insertion window and correspond to the next portion of the main entertainment program and therefore sets the value of MUP=0. Since the MPD information from the generator 152 includes periods corresponding to the main entertainment program (outside alternative content window) the manipulator 1541 sends the MPD information with MUP parameter value set to "0" to the customer device in step 284. As discussed earlier by setting MUP value="0" the customer device 114 is instructed to not periodically request for MPD update but rather when notified, e.g., by in-band "Emsg" in accordance with the invention.

Following receipt in step 286 of MPD file from the manipulator 154 processes the received information. In step 288 using information included in the first program period of the received MPD information, e.g., URL and/or other information, the customer device 114 requests to obtain next content segments of the first program. The processing and signaling associated with steps 288, 289, 290, 292 is similar to that discussed with regard to step 220, 222, 224 and 226. As the customer device 114 is now again receiving content segments corresponding to the first program it can listen to the in-band "Emsg" embedded with the content segments of the first program. In some embodiments at least one content segment of the main program supplied to the customer device includes the in-band "Emsg" that triggers an MPD update request from the customer device. In some embodiments the in-band "Emsg" is included in one of the last content segments of the current portion of the first program being played by the customer device. In the similar manner as discussed with regard to step 230, triggered by the in-band Emsg the customer device in step 294 sends an MPD request to the MPD system 150 to get updated MPD information and the process continues in the similar manner for additional content segments corresponding to the first program.

Figure 3:
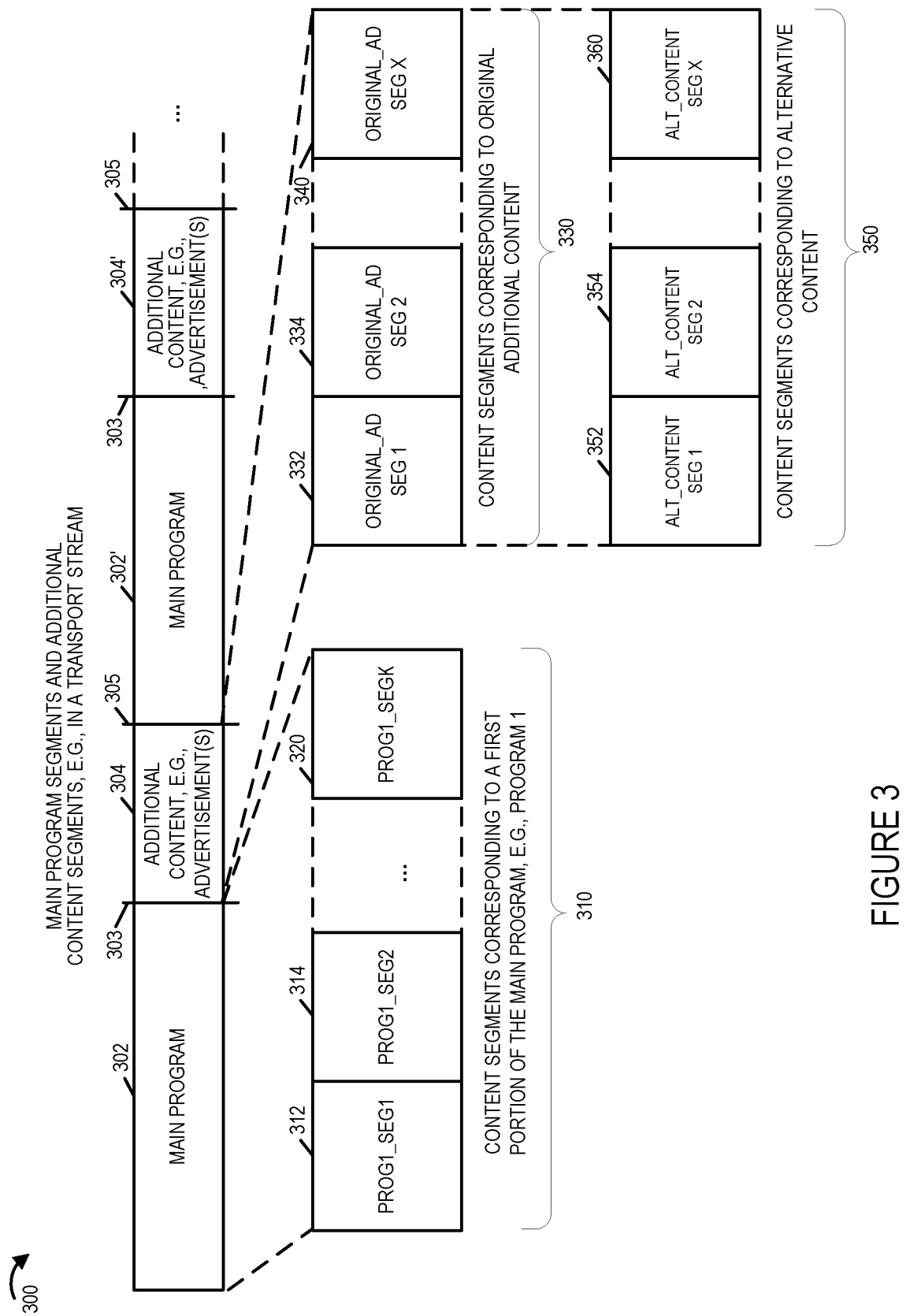
FIG. 3 illustrates an exemplary transport stream including different portions corresponding to an entertainment program and advertisements and show how conceptually default content can be replaced with alternative content in some embodiments.

FIG. 3 illustrates an exemplary transport stream 300, e.g., from the content source 101, including portions (302, 302' . . . ) corresponding to a main entertainment program, e.g., a first entertainment program, and portions (304, 304' . . . ) corresponding advertisements. In the illustrated example the transport stream 300 includes a plurality of segments of the main program interleaved with segments of advertisements as shown. The actual program segments and the advertisement segments in combination comprise default content in the stream 300. In MPEG streams ad boundaries are indicated by indicators/markers 303 which show where an advertisement segment begins in some embodiments while program boundaries indicated by indicators/markers 305 indicates where main program segments begin, e.g., after an advertisement segment. In some embodiments the duration for each segment of the main program and advertisement is also indicated. Such ad and program boundary indicators and/or duration data is communicated via SCTE-35 signaling from the content provider 101 in some embodiments and translated into other desired format so that this information can be used with MPEG DASH content streams.

Each portion (302, 302' . . . ) of the main program may be of different duration and as illustrated each portion may include multiple content segments. For example first portion 302 of the first entertainment program may be 15 minutes in duration and may include K program segments (Prog1_Seg1 312, Prog1_Seg1 312, . . . , Prog1_SegK 320) of the multimedia content corresponding to the first program. Similarly each portion (304, 304' . . . ) of the stream 300 assigned for advertisements may be of different duration, e.g., 30 seconds, 1 minute, 2 minute etc., and as illustrated each portion may include multimedia segments corresponding to one or more advertisements. For example in the first portion 304 meant for advertisements may have one or more ads originally provided by the content provider and may be 2 minutes in duration. The portion 304 may include X original ad content segments (Original_AdSeg1 332, Original_AdSeg2 334, . . . , Original_AdSeg1 340) for the ads to be shown during the 2 minute duration. However in Digital Ad Insertion (DAI) and DASH systems the service provider may wish to replace a default content portion, e.g., original advertisement segments, with segments corresponding to alternative content which may be targeted ads and/or other relevant content selected based on various factors. Thus as shown in the illustrated example the original ad content segments (332 through 340) may be replaced with multimedia content segments corresponding to alternative content shown as the X alternative content segments 352 through 360. In some embodiments not only the replacement of original ads but replacement of the entertainment program segments with alternative program content segments is supported. In accordance with the features of the present invention when such alternative content insertion is desired for MPEG DASH streams, the MPD manipulator 154 replaces and/or adds period for the alternative content in the MPD file as discussed in detail in FIG. 2. The MPD manipulator 154 manipulates the MPD file when desired and sends to the customer device. For example if there is alternative content period in the MPD file, the manipulator 154 checks with the alternative content server 160 if the period should be replaced and replaces it when needed, e.g., so that DASH client devices receiving updated MPD information can obtain the intended alternative content. In some embodiments the MPD manipulator 154 also changes the MUP value to "t" to force the customer device (DASH client) to request MPD file every "t" seconds. However the MUP value is not changed if contents in the original entertainment are not replaced by alternative content.

Figure 4:
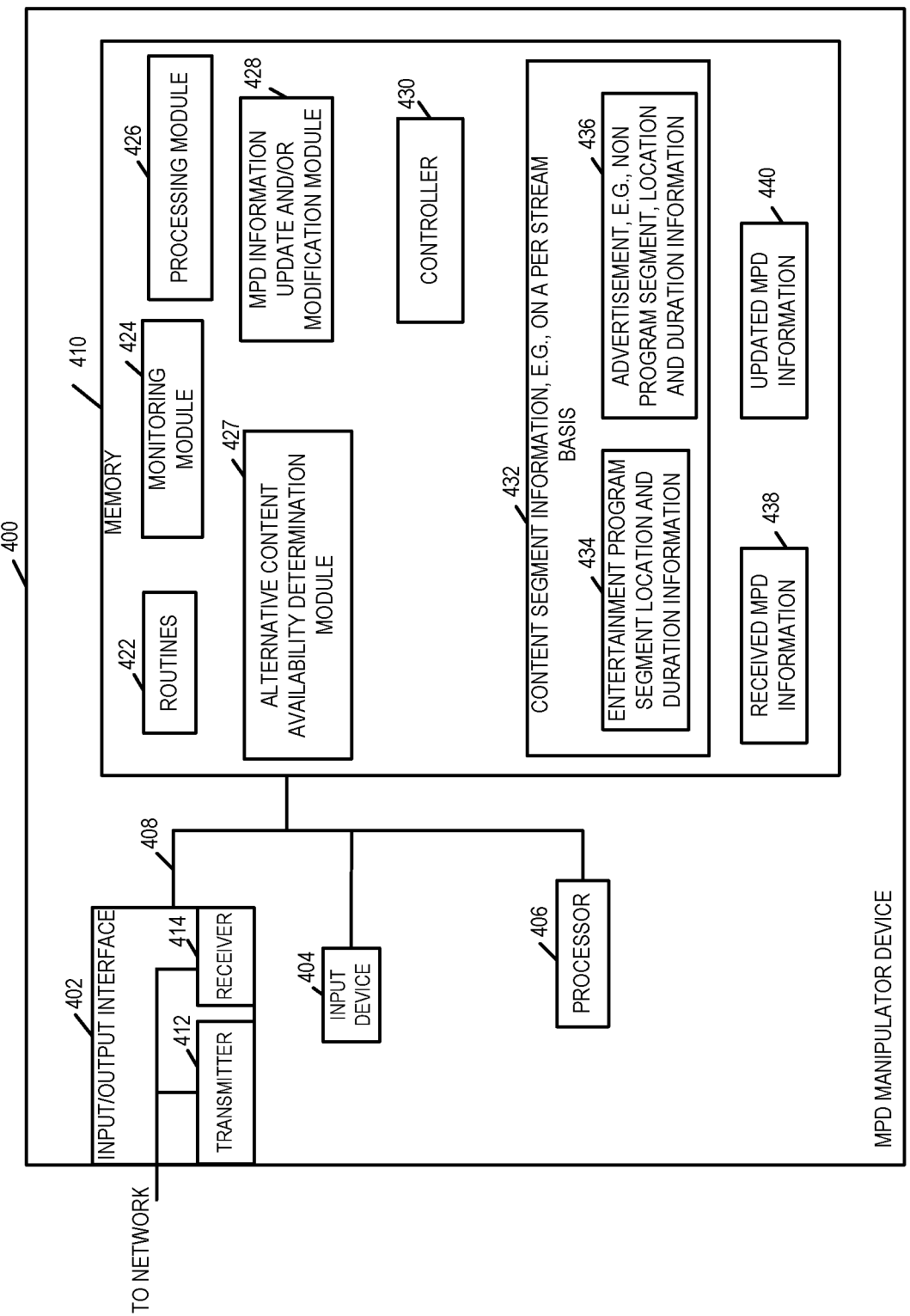
FIG. 4 illustrates an exemplary MPD manipulator device implemented in accordance with an exemplary embodiment.

FIG. 4 illustrates an exemplary MPD manipulator device 400 implemented in accordance with an exemplary embodiment. The exemplary MPD manipulator 400 can be, and in some embodiments is, used as the MPD manipulator 154 shown in FIGS. 1-2. In some embodiments the MPD manipulator 400 is configured to implement at least some of the steps shown in the method of FIG. 2. In accordance with one aspect of some embodiments the exemplary MPD manipulator 400 manipulates, e.g., change/update/modify, an MPD file if needed and provide the manipulated MPD information to the customer device, e.g., in response to a request for MPD information. The MPD manipulator 400 checks with the alternative content server 160 if a period defined in the MPD file should be replaced, e.g., to correspond to and provide information about alternative content, and replace it when needed.

As shown, the control server 400 includes an input/output (I/O) interface 402, an input device 404, a processor 406, and a memory 410 coupled together via a bus 408. The various elements of the MPD manipulator 400 can exchange data and information over the bus 408. The I/O interface 402 includes a transmitter 412 and a receiver 414. In some embodiments via the I/O interface 402 the MPD manipulator 400 is coupled to the network interface 168 of the headend 102 via which information is communicated with the devices located at the customer premises over communications network 170. Furthermore via the I/O interface 402, the MPD manipulator 400 can exchange signals and/or information with other devices and/or system elements such as the servers in the network headend 102 over the local network 151.

The input device 404 may be a keypad, touch screen, and/or other device for receiving and processing input commands/instructions. The processor 406, e.g., a CPU, executes control routines 422, uses one or more modules and stored information to control the MPD manipulator device 400 to operate in accordance with the invention and implement one or more steps of the method 200. Thus to control the operation of MPD manipulator device 400, the processor 406 uses information, various modules and/or routines including instructions stored in memory 410. In some embodiments the processor is configured to control various elements of the MPD manipulator device 400, e.g., such as the transmitter and receiver, to operate in accordance with the invention.

In addition to the routines 422, the memory 410 includes a monitoring module 424, a message processing module 426, an alternative content availability determination module 427, MPD information update module 428, and a control module 430. The data/information in memory includes segment information 432 corresponding to content segments in various content streams, e.g., on a per stream basis. Such information includes, for each stream, entertainment program segment information 434 and advertisement segment information 436. The entertainment program segment information 434 includes e.g., entertainment program segment location information in a given stream, duration of each segment, program boundary indicators and/or start/end time indicators. The information further includes similar advertisement segment information 436 for each content stream including, e.g., ad segment location information in a given stream, duration of each ad segment, ad boundary indicators and/or start/end time indicators. Such information is provided to the MPD manipulator 400 by the content processor 103 in some embodiments. The received MPD information 438 is the non manipulated MPD information received from the MPD generator 152. The updated MPD information 440 is generated by the manipulator 400 using the received MPD information 438 and includes updated, e.g., manipulated/modified, MPD information. The updated MPD information 440 is the output of the MPD information update module 428 and includes changed and/or added alternative content periods, one or more added parameters that may be added by the MPD information update module 428 as part of the update. The updated MPD information 440 may also include changed MUP values, if such change is desired in accordance with the change in other information in the updated MPD information 440.

Routines 422 include communications routines and/or device control routines. The monitoring module 424 is configured to monitor for messages and/or signals from other devices, e.g., customer premise devices located at customer premises as well as other devices at the headend or located externally. For example in various embodiments the monitoring module 424 monitors for a request for MPD information from one or more customer devices. The MPD manipulator 400 is configured to receive such messages and/or signals, e.g., via the receiver 414 of interface 402.

The processing module 426 is configured to process various messages and/or signals (e.g., signals communicating requests for MPD information, content and/or other information as shown in FIG. 2) received by the MPD manipulator 400 via the receiver 414 of interface 402, to recover information, e.g., instruction and/or request to take an action. In various embodiments the processing module 426 is configured to process the received messages and/or signals and provide recovered information to the processor 406 and/or one or more other modules to take further action in response to the received signals.

The alternative content availability determination module 427 is configured determine whether one or more default content segments, e.g., original ad or program segments, are to be replaced, e.g., with alternative content segments. In some embodiment this is achieved by the alternative content availability determination module 427 contacting the alternative content server 160 to determine whether alternative content segments are available or desired for a given customer device, group of customer devices and/or region. Based on a response received from the alternative content server 160 the alternative content availability determination module 427 determines if one or more default content segments, e.g., corresponding to original ads and/or program portion, are to be replaced. When the alternative content server's decision indicates that ads and/or other segments are to be replaced, the alternative content availability determination module 427 provides an indication of the result to the MPD information update module 428, e.g., so that the original ad period and/or other alternative content period in the MPD file can be changed, e.g., to replace and/or add a period corresponding to alternative content.

The MPD information update module 428 is configured to update and/or modify information included in a MPD file (e.g., received from MPD generator 152) in accordance with the features of the present invention as discussed above, e.g., with regard to FIG. 2, when such update/manipulation to the MPD information is desired or needed. As part of the MPD information update in some embodiments the update module 428 is configured to change the value of a first parameter, e.g., MUP, in the MPD information from a first value (e.g., MUP=0) to a second value (e.g., MUP=t, where t is greater than 0). In some embodiments the as part of the MPD information update the update module 428 is further configured to add a second parameter (e.g., xlink:href) to the MPD information that specifies a reference to the MPD manipulator 400 and add a third parameter (e.g., actuate=onRequest) to the MPD information that specifies processing instructions regarding the provided MPD information. For example, the parameter xlink:actuate set to be="onRequest" instructs the DASH client to seek resolution of the URL provided by the xlink:href parameter, e.g., in order to obtain the alternative content period elements (e.g., URL for content segments corresponding to the alternative content) on play time.

The controller 430 is configured to control or facilitate sending/receiving of signals from the MPD manipulator 400, via the interface 402, to one or more other devices, e.g., customer devices, and/or elements of the headend 102 or system 100 in general. Thus the controller 430 is configured to control communications of information from the MPD manipulator 400 to other devices in the system 100, e.g., via the interface 402.

In some embodiments the modules shown in FIG. 4 are, implemented as software modules. In other embodiments the modules are implemented in hardware, e.g., as individual circuits with each module being implemented as a circuit for performing the function to which the module corresponds. In still other embodiments the modules are implemented using a combination of software and hardware.

While shown in FIG. 4 example to be included in the memory 410, the modules shown included in the MPD manipulator 400 can, and in some embodiments are, implemented fully in hardware within the processor 406, e.g., as individual circuits. The modules can, and in some embodiments are, implemented fully in hardware, e.g., as individual circuits corresponding to the different modules. In other embodiments some of the modules are implemented, e.g., as circuits, within the processor 406 with other modules being implemented, e.g., as circuits, external to and coupled to the processor 406. As should be appreciated the level of integration of modules on the processor and/or with some modules being external to the processor may be one of design choice. Alternatively, rather than being implemented as circuits, all or some of the modules may be implemented in software and stored in the memory 410 of the MPD manipulator 400, with the modules controlling operation of the MPD manipulator 400 to implement the functions corresponding to the modules when the modules are executed by a processor, e.g., processor 406. In still other embodiments, various modules are implemented as a combination of hardware and software, e.g., with another circuit external to the processor providing input to the processor 406 which then under software control operates to perform a portion of a module's function.

While shown in the FIG. 4 embodiment as a single processor, e.g., computer, it should be appreciated that the processor 406 may be implemented as one or more processors, e.g., computers. When implemented in software the modules include code, which when executed by the processor 406, configure the processor 406 to implement the function corresponding to the module. In embodiments where the various modules shown in FIG. 4 is stored in the memory 410, the memory 410 is a computer program product comprising a computer readable medium comprising code, e.g., individual code for each module, for causing at least one computer, e.g., processor 406, to implement the functions to which the modules correspond. Completely hardware based or completely software based modules may be used. However, it should be appreciated that any combination of software and hardware, e.g., circuit implemented modules may be used to implement the functions. As should be appreciated, the modules illustrated in FIG. 4 control and/or configure the MPD manipulator 400 or elements therein such as the processor 406, to perform the functions of corresponding steps illustrated and/or described in the earlier discussed figures which are performed as part of the exemplary method of operating the MPD manipulator 400 in accordance with the invention.

In one exemplary embodiment the processor 406 is configured to: control the transmitter 412 to send, e.g., transmit, to a user device (e.g., user device 114), media presentation description (MPD) information including a first parameter having a first value indicating that the user device is not to periodically request media presentation description information, the media presentation description information including information for use in obtaining content segments corresponding to a first program; process a request for media presentation description information, received by the receiver 414 after sending of the media presentation description information, from the user device, and control the transmitter to send to the user device, in response to the request, updated media presentation description information including the first parameter having a second value indicating a time period after which new media presentation description information is to be requested by the user device, the updated media presentation information including information for use in obtaining content segments corresponding to additional content. In some embodiments the request for media presentation description information is triggered by an event message (emsg) included in at least one content segment corresponding to the first program. In some embodiments the request for MPD information is a second request for MPD information preceded by a first request for media presentation description information. In some embodiments the updated media presentation description information includes: i) a second parameter that specifies a reference to the manipulator device as an entity that is to provide additional information to obtain content segments corresponding to the additional content, ii) a third parameter specifying processing instructions regarding processing of at least some information in the updated MPD information, and iii) the first parameter having the second value.

In some embodiments the processor 406 is further configured to process an additional request, e.g., a third request, for media presentation description information received by the receiver after at least some content segments corresponding to the additional content have been supplied from the content delivery system. In some embodiments the processor 406 is further configured to control the transmitter 412 to send to the user device, in response to the additional request, updated media presentation description information including the first parameter having the first value, the updated media presentation description information, which is in response to the additional request, including information for use in obtaining additional content segments corresponding to the first program. In some embodiments the processor 406 is configured to control the transmitter 412 to send the updated media presentation description information in response to the additional request after media presentation description information corresponding to a last content segment of the additional content has been supplied.

In some embodiments the processor 406 is further configured to process a request for additional information received by the receiver 414 following sending of the updated media presentation description information and prior to expiration of the time period indicated by the second value, the request for additional information being a request for additional information for use in obtaining the content segments corresponding to the additional content, and control the transmitter 412 to send a response, to the request for additional information, including information indicating a source of the content segments corresponding to the additional content. In some embodiments the information includes a Uniform Resource Locator (URL) for obtaining the content segments corresponding to the additional content.

In some embodiments the processor 406 is further configured to control the transmitter 412 to send, prior to sending the response, an alternative content information request to an alternative content server, and process alternative content information received by the receiver 414 from the alternative content server. In some embodiments the information indicating a source indicates the alternative content server as the source of the content segments corresponding to the additional content when the alternative content server decides that alternative content is to be provided to the user device in place of default content.

Figure 5:
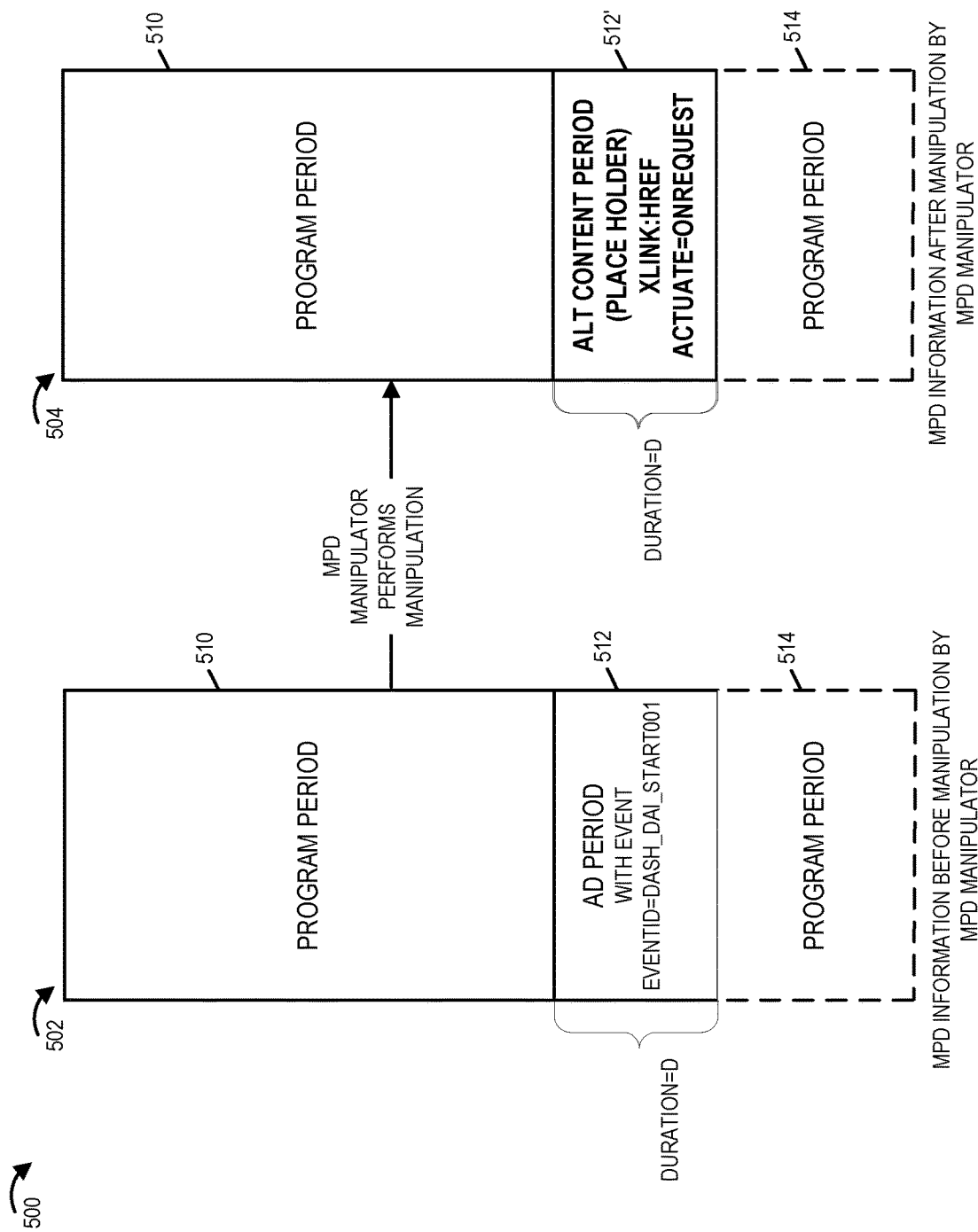
FIG. 5 illustrates an example of MPD information manipulation by the exemplary MPD manipulator device in accordance with one exemplary embodiment.

FIG. 5 is a drawing 500 illustrating an example of MPD information manipulation by the exemplary MPD manipulator device 400/154 in accordance with one exemplary embodiment. In accordance with the features of some embodiments the MPD manipulator device 400/154 manipulates an MPD information file 502 to add and/or manipulate one or more MPD attributes, e.g., parameters, to facilitate providing alternative content to DASH client devices. The MPD information file 502 shows the conditioned MPD information file, e.g., generated by the MPD system 150 but prior to manipulation by the manipulator 400/154. MPD information file 502 includes a program period 510, e.g., period corresponding to the main entertainment program and an ad period 512, e.g., period corresponding to a default ad which may have been provided with main program by the content supplier. There may be additional program period(s) and ad periods in the MPD file 502 as indicated by the additional program period 514 with broken boundary lines.

As discussed in detail earlier in accordance with the features of some embodiments the MPD manipulator 400/154 manipulates the MPD information 502 to ensures that there is a place holder period for alternative content in the MPD file while the MPD manipulator gets alternative content information from the alternative content server 160 regarding alternative content to be provided. The MPD information file 504 shows the conditioned MPD information file after manipulation operation by the manipulator 400/154. As shown the MPD information file 504 includes the program period 510 and ad period 512' with an xlink:href parameter and an xlink:actuate parameter. By adding the xlink:href the MPD manipulator 400/154 creates a place holder period for alternative content while the manipulator gets a response from the alternative content server 160 regarding alternative content if it is to be provided. The xlink:href parameter provides a reference to an entity that may include one or more elements of the period described in the MPD file, e.g., such as the URL for the content segments corresponding to the alternative content. The manipulator 154 adds the xlink:href referencing itself in the xlink:href attribute. Further the manipulator 154 sets the xlink:actuate parameter to be="onRequest" instructing that the customer device should seek resolution from the manipulator 400/154 in order to obtain the alternative content period elements, e.g., URL for content segments corresponding to the alternative content, on play time. In some embodiments the manipulation also includes changing the first parameter (MUP) value from "0" to a new value set to "t".

In some embodiments content is conditioned, e.g., by the content processor 103, at the ad break boundary and program boundary for seamless alternative content switching. Media stream is conditioned through event signaling and management (ESAM) SCC conditioning. In some embodiments DASH MPD file is conditioned through ESAM MCC conditioning. An exemplary conditioning workflow is detailed below:

i) SCTE-35 cue is received by the MPD system 4+ seconds ahead of ad break or a program start (for alternative content).

ii) The MPD system sends ESAM MCC request to a POIS (Placement opportunity information system).

iii) POIS responds with MCC condition instruction and data to insert to MPD EventStream.

The MPD system performs the following in some embodiments:

1. Ends the entertainment program period p1 at the beginning of ad break or program. Inserts In-band "emsg" with "value=1" to Representation(s) in current period p1 to signal to DASH client of new (updated) MPD information availability.

2. (a) Creates a new ad/program period p2 with duration if it is included in the MCC response. MCC response of ProgramStart may or may not contain duration.
   (b) Inserts EventStream in the period with data from MCC response
   (c) At the output of, the media segments of ad period are still from the entertainment content. These segments will be replaced by alternative content once ads/program are replaced.

3. (a) Ends the period p2 at the end of ad break/program, and starts a new period p3 of entertainment content or for next program. This period p3 can continue until next ad break, or next new program (if program boundary is signaled).
   (b) In-Band "emsg" is inserted when period p3 is added if p3 is not in the same MPD as period p2 when MPD update was last triggered.

At the end of MCC conditioning. MPD with an alternative content period with eventStream that contains break/program information is created; inband "emsg" is inserted to representations and send to client. DASH client can either request MPD file constantly, or be triggered by "emsg" to get updated MPD.

DASH supports using inband "emsg" to notify DASH client of MPD update. If a DASH client can receive inband notification of MPD update, it does not have to request MPD file constantly and only gets MPD file when it is updated. It reduces number of MPD requests drastically. It can work perfectly for channels that do not have digital ad insertion (DAI) or alternative content insertion.

When a DASH client is tuned to channels supporting DAI and/or alternative content, it may miss the in-band "emsg" if notification is sent during the presentation of alternative content, e.g, while a client is playing an altcon program segment or an inserted advertisement since the DASH client will be playing different media segments from the ones including the inband "emsg" trigger.

In accordance with the invention DASH inband "emsg" notification is advantageously utilized to trigger MPD update requests in some embodiments during normal program periods and/or segments to minimize the MPD traffic and impact to MM performance. To avoid the potential issue of missing inband "emsg" notification when DASH client is playing alternative content client devices are controlled to poll at controlled intervals for MPD updates during alternative content periods. The DASH client normally downloads the MPD file and then waits for an inband "emsg" notification before getting an MPD update. During alternative content event, MPD system (e.g., MPD manipulator) changes the MPD MinimumUpdatePeriod to "t" seconds which will control the DASH client to request an MPD every "t" seconds, without relying on inband "emsg" to trigger the request for an MPD update.

An exemplary process is detailed below:

1. MPD system sets "minimumUpdatePeriod=0", DASH client requests for new MPD file only when it is notified (by inband "emsg").

2. DASH client request MPD through MPD manipulator. When the request is outside the alternative content providing window the MPD manipulator does not modify MPD information and sends to DASH client.

3. Triggered by inband "emsg" when a new (ad or program) period is created and MPD is updated, DASH client requests for the updated MPD from MPD manipulator.

4. MPD manipulator adds the xlink:href that references to itself and xlink:actuate=onRequest for ads/altcon period so that it can have time to get a response from an alternative content system regarding insertion of alternative content. MM also changes the MUP (minimumUpdatePeriod)=t. This change makes DASH client to request MPD file every t seconds. In some embodiments MUP value is not changed if contents in the original entertainment are not replaced alternative content.

5. MPD system changes the MUP value back to "0" after MPD information including alternative content period has been sent since now DASH client can get the inband "emsg" when MPD is updated.

6. When new ad/program period is created (by MPD system), DASH client triggered by inband "emsg" and requests for the updated MPD from MPD manipulator.

Various embodiments have been discussed above. It should be appreciated that the invention is not intended to be limited by the exemplary embodiments which are to facilitate an understanding of the invention and its many possible applications.

At least some features of some embodiments also allow reducing signaling burden and overloading of MPD information providing system as well as of DASH client devices by providing a mechanism to reduce number of requests for MPD information updates as compared to systems where clients poll throughout the playback period corresponding to an entire program and the additional content segments associated with the program. By limiting MPD update request to being triggered by EMSGs during normal program periods, reduced frequency of MPD update requests from DASH client devices is achieved as compared to implementations where clients request MPD updates routinely. Accordingly, the methods described herein avoid network traffic loading associated with MPD update requests as compared to other approaches and allow for efficient use of an MPD information providing system.

In some embodiments this is achieved by exploiting a first MPD attribute, e.g., parameter, value to notify the customer device to not periodically request updated media presentation description information. In some embodiments the MPD attribute used for this purpose is the Minimum Update Period (MUP) attribute. In some embodiments the MUP parameter is used to control the frequency at which the DASH clients checks for MPD information updates. In some embodiments by setting MUP value="0" the customer device is instructed to not periodically request for MPD update but rather when notified, e.g., by in-band signaling, as discussed below.

Before the customer device actually needs updated MPD information regarding media segments corresponding to alternative content, e.g., at advertisement and/or other content segment boundaries, to obtain media segments corresponding to advertisements and/or alternative content for playback during an upcoming advertisement break slot, the DASH client device is notified via in-band signaling to request updated MPD information. Thus rather than having the customer device periodically (and often unnecessarily) request MPD updates which increases network traffic and decreases MPD system performance, the features of the present invention allow providing MPD updates to client devices in a optimal and efficient manner.

In one accordance with one aspect of some embodiments the in-band signaling is provided via an Event Message (Emsg) included in a media content segment provided to the customer device. In some embodiments one or more media segments are encapsulated in ISO base media file format (ISO BMFF) and include one or more event message (Emsg) boxes which can be used for such in-band signaling for notifying the customer devices of events such as update of MPD information.

Triggered by the event message (Emsg) in the program content segment the customer device requests for updated media presentation description from the MPD system. This trigger to request MPD information update close to the ad boundary of upcoming advertisement slot allows the MPD system to provide updated MPD information to the customer device without excessive overloading of the MPD system and customer device by avoiding the signaling associated with period MPD update requests.

In some embodiments in response to the request for updated MPD information the MPD system sends media presentation description information including information for use in obtaining content segments corresponding to additional content, e.g., advertisements and/or alternative content, to be played. In some embodiments the updated MPD information includes the first parameter set to a second value that indicates a time period after which the customer device should MPD information update requests periodically as indicated by the second value. In some embodiments the second value of the first parameter is set to "t" to indicate that said media presentation description information may change after time period "t". For example the updated MPD information provided in response to the request may include the MUP value set to "t", "t" being non-zero and indicating that the customer device is to request MPD information file every "t" seconds. In some embodiments "t"=6 seconds. When the customer device is receiving media segments corresponding to alternative content the customer device is unable to get the in-band event messages since the alternative content segments do not include event message that is used for in-band signaling. Thus in accordance with one aspect to resolve the issue of missing in-band "Emsg" notification during playing of alternative content segments the MPD system changes the MUP value in the updated MPD information to "t" thereby instructing the customer device to check back for updated MPD information after every "t" seconds.

In addition to the changing MUP value in some embodiments the MPD system manipulates, e.g., add and/or modify, one or more MPD file attributes, prior to sending MPD information to customer devices, that allows the system to have sufficient time to determine if actual advertisement content for an upcoming advertisement break should be switched with replacement ads, e.g., targeted replacement ads and/or/alternative content. In some embodiments the MPD system requests an ad replacement decision from an advertisement server. In some embodiments if the decision is to replace original ads with replacement ads and/or alternative content the MPD system modifies and sends modified MPD information, e.g., including one or more periods corresponding to replacement ads and/or alternative content. In some embodiments such modification includes performing one or more of the following: adding a second parameter (e.g., xlink:href), adding a third parameter (e.g., xlink:actuate) and changing the MUP value from "0" to a new value set to "t". The xlink:href parameter provides a reference to an entity that may include one or more elements of the period described in the MPD file, e.g., such as the URL for the content segments corresponding to the alternative content. In some embodiments the MPD system adds the xlink:href referencing itself. In some embodiments the xlink:actuate parameter is set="onRequest" instructing that the customer device should seek resolution of the URL provided by the xlink:href parameter, e.g., in order to obtain the alternative content period elements (e.g., providing URL for content segments corresponding to the alternative content), on play time. By adding the xlink:href and xlink:actuate parameters the MPD system buys time to request alternative content information and get a response from the alternative content server, e.g., whether the media segments corresponding to an upcoming slot should be replaced with alternative content segments.

In some embodiments the alternative content server makes a decision whether content segments for an upcoming ad slot should be replaced, e.g., with alternative content to be played in place of the original ads, and sends a response back to the MPD system. In some embodiments the response include instructions on what alternative content to provide to the customer device and where such alternative content is located. In some embodiments the alternative content server is, e.g., a digital advertisement insertion (DAI) server.

Further in accordance with one aspect of some embodiments after content segments corresponding to the alternative content have been supplied from the content delivery network and after expiration of time period "t" indicated in a MUP of the last supplied MPD file, the MPD system in some embodiments receives a request for MPD information update from the customer device, e.g., for MPD information corresponding to next media segment(s) of the entertainment program. In some embodiments in response to the request, MPD file including information regarding the next segment(s) of the first entertainment program but with the minimum update period (MUP) parameter value again set to "0". As discussed earlier by again setting MUP value="0" the MPD traffic, customer device signaling burden as well as negative impact on the MPD system performance are minimized. Thus various features allow service providers to dynamically update and provide media information without having the DASH clients to constantly download MPD files to check for updated MPD information thereby optimizing network traffic, avoiding negative impact on system performance.

The methods and apparatus of the present invention are well suited for use where a content stream may include program content, e.g., entertainment program, and non-program content, e.g., advertisement. While the term program is used in various locations in the present application it should be appreciated that the term is not limited to television programs but is intended to also cover movies or other audio/video content. The methods and apparatus described herein can and in some embodiments are, used to provide customers access to variety of content, including programs and advertisements, across a variety of user devices and delivery platforms including using streaming over HTTP.

An exemplary method of providing content related information that can be implemented in accordance with some embodiments using the system, e.g., system 100, of the present invention comprises: sending, to a user device, media presentation description (MPD) information including a first parameter having a first value indicating that said user device is not to periodically request media presentation description information, said media presentation description information including information for use in obtaining content segments corresponding to a first program; receiving a second request for media presentation information from said user device; and sending, to said user device, updated media presentation description information including said first parameter having a second value indicating a time period after which new media presentation description information is to be requested by the user device, said updated media presentation information including information for use in obtaining content segments corresponding to additional content.

In some embodiments the second request for media presentation description information is triggered by an event message (emsg) included in at least one content segment corresponding to said first program. In some embodiments the media presentation description (MPD) information is included in a dynamic adaptive streaming over HTTP (DASH) MPD file, and at least one segment corresponding to said first program is encapsulated in ISO base media file format (ISO BMFF) and includes an event message (emsg) box. In some embodiments the in-band emsg indicates to a user device that said updated media presentation description information is available.

In some embodiments the first parameter is a minimum update period, said value of the first parameter indicating the smallest time period between changes to the media presentation description information. In some embodiments the first program is a user selected entertainment program and the additional content is alternative content different from said user selected entertainment program. In some embodiments the additional content is one of: a target advertisement, locally or regionally relevant content, local weather update segment, traffic update segment, or breaking news update segment to be output by said user device. In some embodiments the additional content is an alternative entertainment program to be output by said user device.

In some embodiments the second value of said first parameter is set to "t" to indicate that said media presentation description information may change after time period "t". In some embodiments the method further comprises: receiving, after at least some content segments corresponding to the additional content have been supplied from said content delivery system, a third request for media presentation description information.

In some embodiments the method further comprises: sending to said user device, in response to said third request, updated media presentation description information including said first parameter having said first value, said updated media presentation description information, which is in response to said third request, including information for use in obtaining additional content segments corresponding to said first program.

In some embodiments the updated media presentation description information in response to said third request is sent after media presentation description information corresponding to a last content segment of said additional content has been supplied. In some embodiments the method further comprises: receiving, following sending of the updated media presentation description information and prior to expiration of said time period indicated by said second value, a request for additional information for use in obtaining said content segments corresponding to the additional content; and sending a response, to said request for additional information, including information indicating a source of said content segments corresponding to the additional content. In some embodiments the information includes a URL for obtaining said content segments corresponding to the additional content.

In some embodiments the method further comprises: sending, prior to sending said response, an alternative content information request to an alternative content server; and receiving alternative content information from the alternative content server.

In some embodiments the information indicating a source indicates said alternative content server as said source of said content segments corresponding to the additional content when said alternative content server decides that alternative content is to be provided to said user device in place of default content. In some embodiments the information indicating a source indicates a default content server as said source of said content segments corresponding to the additional content when said alternative content server decides that alternative content is not to be provided to said user device.

In some embodiments the updated media presentation description information includes: i) a second parameter that specifies a reference to the MPD manipulator as an entity that is to provide additional information to obtain content segments corresponding to the additional content, ii) a third parameter specifying processing instructions regarding processing of at least some information in said updated MPD information, and iii) said first parameter having said second value. In some embodiments the processing instructions instruct the user device to seek said additional information from the manipulator device when said content segments corresponding to the additional content are to be played.

In various embodiments system elements described herein are implemented using one or more modules which are used to perform the steps corresponding to one or more methods of the present invention.

In the above described methods, in some embodiments, each step may be performed by one or more different software instructions executed by a computer processor, e.g., a central processing unit (CPU). At least one system implemented in accordance with the present invention includes a means for implementing each of the various steps which are part of the methods of the present invention. Each means may be, e.g., an instruction, processor, hardware circuit and/or combination of elements used to implement a described step.

Many of the above described methods or method steps can be implemented using machine, e.g., computer, executable instructions, such as software, included in a non-transitory machine, e.g., computer, readable medium used to control a machine, e.g., general purpose computer with or without additional hardware, to implement all or portions of the above described methods, e.g., in one or more nodes. The machine readable medium may be, e.g., a memory device, e.g., RAM, floppy disk, etc. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow.

What is claimed is:

1. A method of operating a content delivery system, the method comprising:
    sending from a media presentation description (MPD) system, to a user device, media presentation description (MPD) information corresponding to a first program, said MPD information corresponding to the first program including a first parameter having a first value indicating that said user device is not to periodically request media presentation description information, said media presentation description information including information for use in obtaining content segments corresponding to the first program;
    sending, from a content server, content segments of said first program;
    receiving, subsequent to sending the media presentation description information corresponding to the first program, and prior to the user device receiving additional content segments corresponding to the first program, a request for media presentation description information from said user device, said request for media presentation description information being triggered by a message included in one of the content segments of said first program; and
    sending in response to said request, to said user device, updated media presentation description information including said first parameter having a second value indicating a time period after which new media presentation description information is to be requested by the user device, said updated media presentation information including information for use in obtaining content segments corresponding to additional content.

2. The method of claim 1, wherein said first parameter is a minimum update period, said value of the first parameter indicating the smallest time period between changes to the media presentation description information.

3. The method of claim 1,
    wherein said first program is a user selected entertainment program; and
    wherein the content segments of the first program are sent to the user device prior to receipt of said request for media presentation description information from said user device; and
    wherein said additional content is alternative content different from said user selected entertainment program.

4. The method of claim 3, further comprising:
receiving from the user device an initial MPD request for media presentation description information corresponding to the first program prior to receiving said request for media presentation description information from said user device; and
wherein said additional content corresponds to one of: a target advertisement, locally or regionally relevant content, local weather update segment, traffic update segment, or breaking news update segment to be output by said user device.

5. The method of claim 1, further comprising:
receiving, after at least some content segments corresponding to the additional content have been supplied from said content delivery system, an additional request for media presentation description information.

6. The method of claim 5, further comprising:
sending to said user device, in response to said additional request, updated media presentation description information including said first parameter having said first value, said updated media presentation description information, which is in response to said additional request, including information for use in obtaining additional content segments corresponding to said first program.

7. The method of claim 6, wherein said request for media presentation description information is a second request preceded by a first request for media presentation description information;
wherein said additional request for media presentation description information is a third request which follows said second request; and
wherein said updated media presentation description information in response to said additional request is sent after media presentation description information corresponding to a last content segment of said additional content has been supplied.

8. The method of claim 1, further comprising:
receiving, following sending of the updated media presentation description information and prior to expiration of said time period indicated by said second value, a request for additional information for use in obtaining said content segments corresponding to the additional content; and
sending a response, to said request for additional information, including information indicating a source of said content segments corresponding to the additional content.

9. The method of claim 8, wherein said information includes a Uniform Resource Locator (URL) for obtaining said content segments corresponding to the additional content.

10. The method of claim 8, further comprising:
sending, prior to sending said response, an alternative content information request to an alternative content server; and
receiving alternative content information from the alternative content server.

11. The method of claim 10, wherein said information indicating a source indicates said alternative content server as said source of said content segments corresponding to the additional content when said alternative content server decides that alternative content is to be provided to said user device in place of default content.

12. The method of claim 1, wherein said updated media presentation description information includes: i) a second parameter that specifies a reference to a manipulator device as an entity that is to provide additional information to obtain content segments corresponding to the additional content, ii) a third parameter specifying processing instructions regarding processing of at least some information in said updated MPD information, and iii) said first parameter having said second value.

13. A content delivery system, comprising:
a transmitter;
a receiver configured to receive signals from other devices; and
a processor configured to:
control said transmitter to send, to a user device, media presentation description (MPD) information corresponding to a first program, said MPD information including a first parameter having a first value indicating that said user device is not to periodically request media presentation description information, said media presentation description information including information for use in obtaining content segments corresponding to the first program;
control a content server to send content segments of said first program to the user device;
process a request for media presentation description information, received by said receiver after sending of said media presentation description information and prior to the user device receiving additional content segments corresponding to the first program, said request being from said user device, said request for media presentation description information being triggered by a message included in one of the content segments of said first program; and
control said transmitter to send to said user device, in response to said request, updated media presentation description information including said first parameter having a second value indicating a time period after which new media presentation description information is to be requested by the user device, said updated media presentation information including information for use in obtaining content segments corresponding to additional content.

14. The content delivery system of claim 13, wherein said processor is further configured to process an additional request for media presentation description information received by said receiver after at least some content segments corresponding to the additional content have been supplied from said content delivery system.

15. The content delivery system of claim 14, wherein said processor is further configured to control said transmitter to send to said user device, in response to said additional request, updated media presentation description information including said first parameter having said first value, said updated media presentation description information, which is in response to said additional request, including information for use in obtaining additional content segments corresponding to said first program.

16. The content delivery system of claim 15, wherein said processor is configured to control said transmitter to send said updated media presentation description information in response to said additional request after media presentation description information corresponding to a last content segment of said additional content has been supplied.

17. The content delivery system of claim 13, wherein said processor is further configured to process a request for additional information received by said receiver following sending of said updated media presentation description information and prior to expiration of said time period indicated by said second value, said request for additional information being a request for additional information for use in obtaining said content segments corresponding to the additional content; and wherein said processor is configured to control said transmitter to send a response, to said request for additional information, including information indicating a source of said content segments corresponding to the additional content.

18. The content delivery system of claim 17, wherein said information includes a Uniform Resource Locator (URL) for obtaining said content segments corresponding to the additional content.

* * * * *